United States Patent
Shibuya

(10) Patent No.: US 9,640,140 B2
(45) Date of Patent: May 2, 2017

(54) COLOR MANAGEMENT SYSTEM

(71) Applicant: Takeshi Shibuya, Kanagawa (JP)

(72) Inventor: Takeshi Shibuya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 330 days.

(21) Appl. No.: 13/767,240

(22) Filed: Feb. 14, 2013

(65) Prior Publication Data

US 2013/0207996 A1    Aug. 15, 2013

(30) Foreign Application Priority Data

Feb. 15, 2012 (JP) ................. 2012-030416

(51) Int. Cl.
*G09G 5/02* (2006.01)
*G06F 3/14* (2006.01)
(Continued)

(52) U.S. Cl.
CPC ............. *G09G 5/02* (2013.01); *G06F 3/1454* (2013.01); *G09G 5/003* (2013.01); *H04N 1/603* (2013.01);
(Continued)

(58) Field of Classification Search
CPC ................. G06F 3/1454; G09G 5/02
(Continued)

(56) References Cited

U.S. PATENT DOCUMENTS 5,270,808 A * 12/1993 Tanioka .................. H04N 1/644
358/500
H1506 H * 12/1995 Beretta .......................... 345/591
(Continued)

FOREIGN PATENT DOCUMENTS

JP     2003-60925 A   2/2003
JP        3513334      1/2004
(Continued)

OTHER PUBLICATIONS

Office Action issued Nov. 24, 2015 in Japanese Patent Application No. 2012-030416.

*Primary Examiner* — Jacinta M Crawford
*Assistant Examiner* — Jitesh Patel
(74) *Attorney, Agent, or Firm* — Oblon, McClelland, Maier & Neustadt, L.L.P.

(57) ABSTRACT

A color management system is provided that includes a color transformation unit that uses a profile connection space to perform a color transformation process on input image data based on an input side color transformation parameter associated with the input image data for translating an input device-dependent color value that describes the input image data into a device-independent color value of the profile connection space and an output side color transformation parameter for matching the device-independent color value to an output device-dependent color value. The color management system further includes an output device selection unit that enables a user to select at least two output devices from plural output devices that are available for selection, and a profile connection space generation unit that automatically generates the profile connection space according to a predetermined profile connection space generation method based on the gamuts of the output devices selected by the user.

19 Claims, 8 Drawing Sheets

(51) Int. Cl.
*G09G 5/00* (2006.01)
*H04N 1/60* (2006.01)

(52) U.S. Cl.
CPC ............ *G09G 2320/0666* (2013.01); *G09G 2320/0693* (2013.01); *G09G 2320/08* (2013.01); *G09G 2340/06* (2013.01); *G09G 2370/042* (2013.01)

(58) Field of Classification Search
USPC .......................................... 382/167; 345/604
See application file for complete search history.

(56) References Cited

U.S. PATENT DOCUMENTS

| | | | | |
|---|---|---|---|---|
| 5,502,555 | A * | 3/1996 | Lakatos | G03G 15/6508 271/9.01 |
| 5,539,540 | A * | 7/1996 | Spaulding | H04N 1/6058 358/501 |
| 5,774,146 | A * | 6/1998 | Mizutani | B41J 2/21 347/12 |
| 6,269,184 | B1 * | 7/2001 | Spaulding | H04N 1/622 345/604 |
| 6,525,721 | B1 * | 2/2003 | Thomas | G06F 3/0481 345/594 |
| 6,967,746 | B1 * | 11/2005 | Walker | H04N 1/6058 358/1.15 |
| 7,423,780 | B1 * | 9/2008 | MacLeod | 358/1.9 |
| 7,911,665 | B1 * | 3/2011 | Borg | 358/518 |
| 2002/0154166 | A1 * | 10/2002 | Sanders et al. | 345/764 |
| 2002/0163669 | A1 * | 11/2002 | Yamazaki | H04N 1/6075 358/3.23 |
| 2003/0001860 | A1 * | 1/2003 | Yamazaki | H04N 1/6058 345/590 |
| 2003/0053683 | A1 * | 3/2003 | Newman et al. | 382/162 |
| 2003/0117435 | A1 * | 6/2003 | Hiramatsu et al. | 345/745 |
| 2003/0123072 | A1 * | 7/2003 | Spronk | H04N 1/4078 358/1.9 |
| 2003/0202194 | A1 * | 10/2003 | Torigoe | H04N 1/628 358/1.9 |
| 2005/0036171 | A1 * | 2/2005 | Bala | H04N 1/6058 358/2.1 |
| 2005/0110798 | A1 * | 5/2005 | Zeng | H04N 1/4078 345/600 |
| 2005/0146735 | A1 * | 7/2005 | Ternasky | H04N 1/603 358/1.9 |
| 2005/0195415 | A1 * | 9/2005 | De Baer | 358/1.9 |
| 2005/0249403 | A1 * | 11/2005 | Haikin | 382/162 |
| 2006/0110031 | A1 * | 5/2006 | Bala | H04N 1/603 382/162 |
| 2006/0119610 | A1 * | 6/2006 | Stokes | G09G 5/02 345/589 |
| 2007/0081176 | A1 * | 4/2007 | Newman et al. | 358/1.9 |
| 2007/0195345 | A1 * | 8/2007 | Martinez et al. | 358/1.9 |
| 2008/0123948 | A1 * | 5/2008 | De Baer | 382/167 |
| 2008/0192269 | A1 * | 8/2008 | Chang | 358/1.9 |
| 2008/0218779 | A1 * | 9/2008 | Shirasawa | H04N 1/6058 358/1.9 |
| 2009/0051973 | A1 * | 2/2009 | Kise | 358/3.23 |
| 2009/0208101 | A1 * | 8/2009 | Harigai | 382/167 |
| 2009/0279112 | A1 * | 11/2009 | Shestak et al. | 358/1.9 |
| 2009/0284774 | A1 * | 11/2009 | Kishimoto | 358/1.9 |
| 2010/0054589 | A1 * | 3/2010 | Ishii | 382/167 |
| 2010/0231728 | A1 * | 9/2010 | Holub | 348/207.2 |
| 2011/0069077 | A1 * | 3/2011 | Chen et al. | 345/589 |
| 2011/0141497 | A1 * | 6/2011 | Willamowski | H04N 1/00408 358/1.9 |
| 2011/0249015 | A1 * | 10/2011 | Lonkar | 345/589 |
| 2011/0304863 | A1 * | 12/2011 | Shibuya | H04N 1/6097 358/1.9 |
| 2012/0307264 | A1 * | 12/2012 | Arregui et al. | 358/1.9 |
| 2014/0040743 | A1 * | 2/2014 | Constable et al. | 715/722 |

FOREIGN PATENT DOCUMENTS

| | | |
|---|---|---|
| JP | 2009-33601 A | 2/2009 |
| JP | 2009-171164 | 7/2009 |
| JP | 2009-212841 A | 9/2009 |

* cited by examiner

COLOR MANAGEMENT SYSTEM

BACKGROUND OF THE INVENTION

1. Field of the Invention

The disclosures herein generally relate to a system for realizing color management between color image output devices.

2. Description of the Related Art

Image processing that is referred to as color management is performed to match the color representations of various color image output devices such as a color monitor, a color printer, and a copier that output color images based on digital color image signals.

As color management techniques, the color management architecture promulgated by the ICC (International Color Consortium) and ICC profiles defining the corresponding data format are widely known.

In a color transformation process based on the ICC architecture, input image data is transformed from an input device color space to an output device color space via a device-independent color space that is referred to as PCS (Profile Connection Space).

In the ICC architecture, the CIE 1976 (L*, a*, b*) color space, the CIE 1931 XYZ color space, or PRMG (Perceptual Reference Media Gamut) corresponding to a stable reference space for the above color spaces may be used as the PCS.

The range of colors that may be reproduced by a device on the PCS is referred to as "gamut." In color management, since the gamut of an input device and the gamut of an output device are different in most cases, gamut mapping has to be performed to rearrange the boundary of the gamut of the input device to be within the boundary of the gamut of the output device.

Since such gamut mapping process depends on the color attributes of the output device, in a case where plural printers with different gamuts can be used via a network, for example, if a user is to make color adjustments in contemplation of an output image of a selected printer, the user may have to reassess the color adjustment results each time the printer corresponding to the output destination is switched.

In this regard, Japanese Patent No. 3513334 discloses performing gamut mapping on a common gamut of plural output devices to match the color reproduction ranges of plural output devices. However, in the disclosed technique, the color reproduction range is limited to the common gamut of the plural output devices. Thus, in a case where an output destination may be selected from plural different types of output devices with different gamuts, the common gamut of the output devices may be too narrow with respect to the gamut of the input device.

It is noted that a user does not necessarily designate all available output devices as the output destination. That is, generally, a user designates only devices with a wide gamut as the output destination, or only devices with a narrow gamut as the output destination. Also, even when a combination of wide gamut devices and narrow gamut devices are designated as the output destinations, the output devices may have different priorities with respect to color reproduction. For example, certain output devices may have a high priority for color reproduction while other output devices may be used merely to check the layout of an output image. In practice, depending on the document to be output, there may be instances where a common color reproduction range is desired among the output destination devices and instances where the output devices have different priorities with respect to color reproduction.

It is particularly noted that when an output image of a wide gamut device is desired but a PSC that is narrower than the gamut of the output device is used, adequate saturation and contrast may not be reproduced. On the other hand, when an output image of a narrow gamut device is desired but a PSC with a wider gamut is used, the colors of the output image may be over-saturated.

Also, it is noted that the above described priorities with respect to color reproduction needs to be shared by members of a working group that work together through division of labor and collaboration to produce printed matter. However, when a dedicated PCS for a shared objective is not used, the PCS tends to be unnecessarily wide and it may be difficult to obtain a consensus among the members of the working group on the priorities with respect to color reproduction.

SUMMARY OF THE INVENTION

It is a general object of at least one embodiment of the present invention to provide a color management system that substantially obviates one or more problems caused by the limitations and disadvantages of the related art. It is one particular object of at least one embodiment of the present invention to provide a color management system that enables a suitable PCS to be easily set up by flexibly accommodating to various combinations of image output devices that are selected as output targets in an environment where documents are edited and produced through collaboration using different types of output devices as output targets, for example.

In one embodiment, a color management system is provided that includes a color transformation unit that uses a profile connection space to perform a color transformation process on input image data based on an input side color transformation parameter associated with the input image data for translating an input device-dependent color value that describes the input image data into a device-independent color value of the profile connection space and an output side color transformation parameter for matching the device-independent color value to an output device-dependent color value. The color management system includes an output device selection unit that enables a user to select at least two output devices from plural output devices that are available for selection, and a profile connection space generation unit that automatically generates the profile connection space according to a predetermined profile connection space generation method based on at least a first gamut and a second gamut of the output devices selected by the user.

It is noted that an image output device that has different output conditions depending on certain criteria such as the type of paper or color material (ink, toner) used may be regarded as plural different output devices with different profiles corresponding to the different output conditions.

According to an aspect of the present invention, a user may simply select plural output devices as output targets and the color management system may set up a suitable PSC based on the gamuts of the selected output devices.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention are described with reference to the accompanying drawings.

Figure 1:
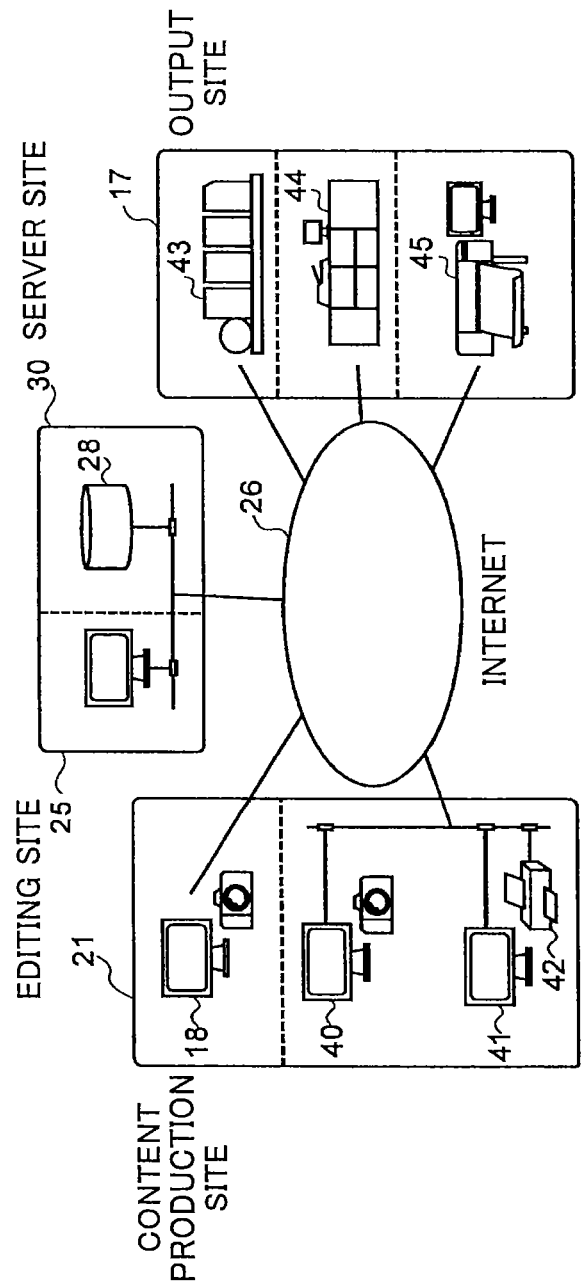
FIG. 1 is a diagram showing a network environment in which a color management system according to an embodiment of the present invention may be implemented.

A color management system according to an embodiment of the present invention may be implemented in a network environment as shown in FIG. 1. The color management system may be a service accessible to plural sites such as an output site 17, a content production site 21, an editing site 25, and a server site 30.

At the content production site 21, plural content producers (users) produce contents by developing and editing various images such as photographic images captured by a scanner or a digital still camera (DSC), computer graphics (CG), and/or illustrations (collectively referred to as "contents" hereinafter) using PCs 18, 40, 41, for example. The users of the content production site 21 may also check the processed images by outputting the images to the monitors of the PCs 18, 40, 41, or a printer 42, and upload the finished contents in a resource database (DB) 28 of the server site 30. Further, the users of the content production site 21 may perform processes such as profile editing and assignment (association) of profiles to contents that are described in detail below. It is noted that the content production site 21 is not limited to one physical location. For example, the PCs 18, 40, 41 may be located at different offices, or one or more of the PCS 18, 40, 41 may be a mobile PC that may be used remotely.

The output site 17 includes plural types of output devices such as an offset printer 43, a laser printer 44, and an inkjet printer 45. The output site 17 outputs a printed copy in response to a print request from the editing site 25. It is noted that the above output devices may be located in the same room or the same building, or they may be spread in different locations.

At the editing site 25, the contents stored in the resource DB 28 may be used as a base material to edit a document and a print request for printing the edited document may be issued to the output site 17. Also, a PCS (Profile Connection Space) may be created (generated/edited) according to the output devices selected from a group of output devices including output devices 43-45 of the output site 17, and the printer 42 and the monitor of the PC 41 of the content production site 21, for example. The resulting PCS may be registered in a profile DB 29 (see FIG. 2) of the server site 30, and identification information of the PCS may be sent to the content production site 21. It is noted that profile editing and assignment (association) of profiles to contents may also be performed at the editing site 25.

PSC refers to a partial region of a device-independent color space such as the Lab color space or the XYZ color space, for example. A profile such as the ICC profile describes the color attributes of a particular device including color transformation parameters for transforming device-dependent color values such as RGB or CMYK values into PCS values, color parameters for transforming the PCS values into device-dependent color values, and gamut information indicating the range of colors that may be output by the particular device.

An RGB profile corresponds to a profile of a device that uses the RGB color space as the input parameter. A CMYK profile corresponds to a profile of a device that uses the CMYK color space as the input parameter. It is noted that a device such as a printer that may reproduce different output colors depending on the type of paper used may have a different profile for each of the different types of paper with differing color reproducing characteristics. In such a case, the color profile corresponding to the output side color transformation parameter may be referred to as "paper profile". It is also noted that the color profile corresponding to the input side color parameter may be referred to as "simulation profile" since it defines color reproduction characteristics based on device characteristics that are different from those of the actual output device.

In the following, for the sake of simplifying the descriptions, it is assumed that the CIE 1976 (L*, a*, b*) color space is used as the color system of the PCS, and a partial region of the CIE 1976 (L*, a*, b*) color space is used as the PCS. However, the profiles used in the present invention are not limited to ICC profiles, and in other embodiments, other Lab color systems, XYZ color systems, as well as color systems based on CIECAM02 JCh and IPT may be used. In the case where CIECAM02 JCh or IPT is used, although calculation processes may be complicated, hue preservation characteristics may be improved (particularly the hue preservation characteristics at the violet-blue region).

Figure 2:
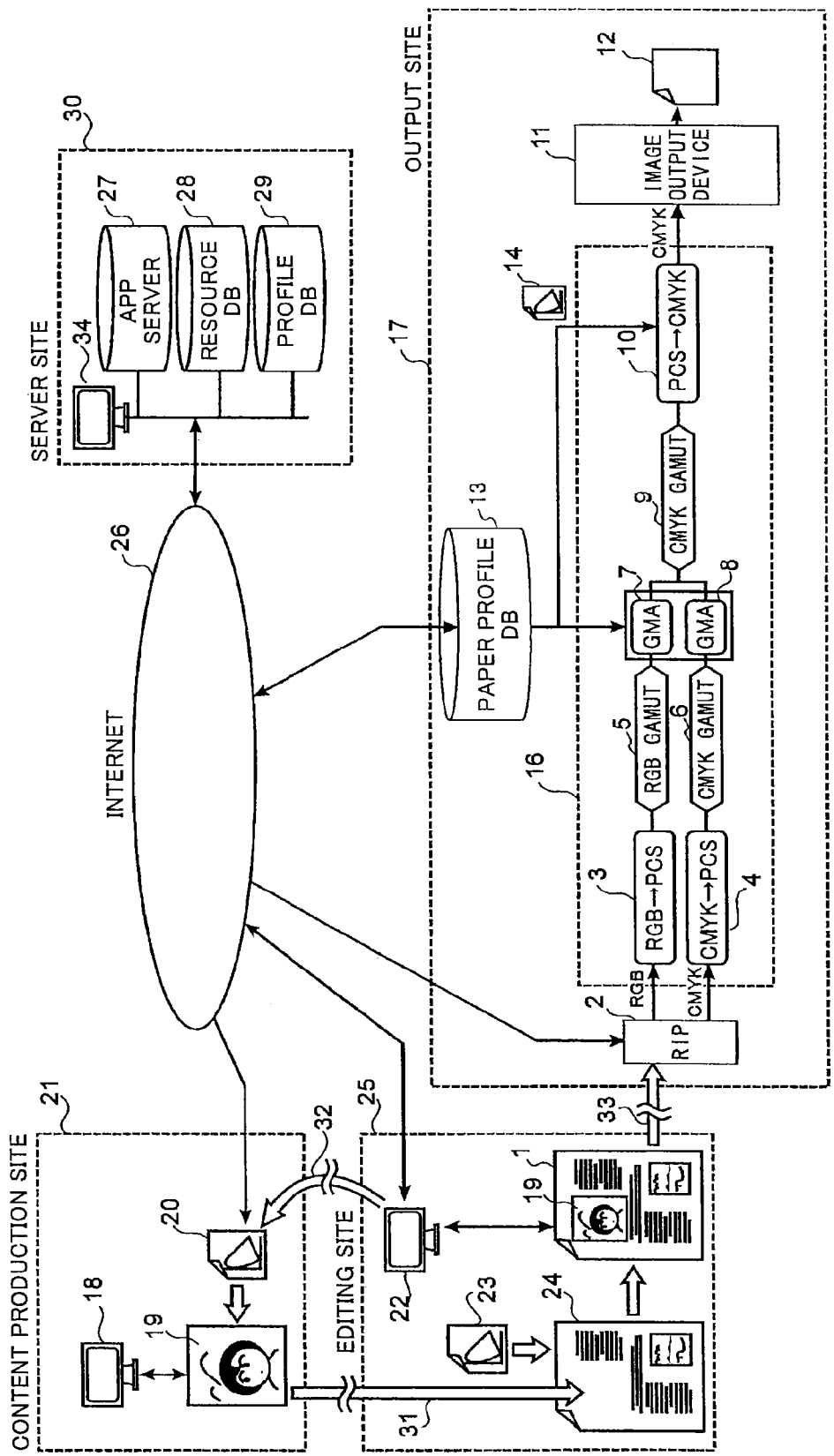
FIG. 2 is a block diagram showing a functional configuration and a process flow of the color management system.

FIG. 2 is a diagram showing an exemplary functional configuration and process flow of the color management system according to the present embodiment. Specifically, FIG. 2 illustrates an exemplary color management process in which an output device that requires a CMYK image as input data (e.g., CMYK laser printer) is selected as the output device.

At the output site 17, a RIP (Raster Image Processor) 2 that is connected to an image output device 11 (a CMYK laser printer in the present example) develops document image data 1 that is edited at the editing site 25 into bitmap data according to the resolution of the image output device 11.

Then, a RGB→PCS transformation 3 converts the bitmap data of RGB image data 19 embedded in the document image data 1 into Lab values on an RGB gamut 5 formed within the corresponding PCS according to an RGB profile 20 that is associated with the RGB data 19. Also, a CMYK-→PCS transformation 4 converts the bitmap data of CMYK image data 24 embedded in the document image data 1 into Lab values on a CMYK gamut 6 formed within the corresponding PCS according to CMYK profile 23 that is associated with the CMYK data 24.

In the RGB→PCS transformation 3, in addition to the color transformation from RGB to Lab, gamut mapping is performed to compress the original RGB gamut within the range of the PCS. The RGB gamut 5 after the color transformation corresponds to a gamut obtained by confining the original RGB gamut of the RGB image data 19 to a common portion with the PCS. Similarly, in the CMYK→PCS transformation 4, in addition to the color transformation from CMYK to Lab, gamut mapping is performed to compress the original CMYK gamut to be within the range of the PCS. The CMYK gamut 6 after the color transformation corresponds to a gamut obtained by confining the original CMYK gamut of the CMYK image data 23 to a common gamut with the PCS.

Then GMAs (Gamut Mapping Algorithms) 7, 8 are applied to the Lab values on the RGB gamut 5 and the Lab values on the CMYK gamut 6, respectively, so that the Lab values may be mapped on a CMYK gamut 9 according to the paper setting of the image output device 11. Then, a PCS→CMYK transformation 10 develops and/or synthesizes the Lab data of the two types of images mapped on the CMYK gamut 9 into CMYK frame sequential data and inputs the resulting data to the image output device. In turn, the image output device 11 outputs the input image data as an output image 12. It is noted that control parameters of the GMAs 7 and 8, information on the CMYK gamut 9, and color transformation parameters of the PCS→CMYK transformation 10 may be determined by a paper profile 14 that is selected from a paper profile DB 13. Also, it is noted that the GMA 7 and the GMA 8 may be the same.

In the present example, a color transformation unit 16 is realized by independent processes that are performed after the processes performed by the RIP 2. However, in other examples, the processes of the color transformation unit 16 may be realized by processes performed within the RIP 2. It is noted that by performing color transformation of color values as part of the processes of the RIP 2, processing efficiency may generally be improved.

The paper profile 14 is stored in the paper profile DB 13, which is preferably located at a site close to the image output device 11. In a case where a paper profile with high versatility is used, such as when the same type of device is used at plural different sites, the paper profile 14 may be stored in synch with the profile DB 29 of the server site 30 corresponding to a shared DB.

At the editing site 25, a user assigns an appropriate simulation profile (CMYK profile in the present example) 23 to the CMYK data 24 of the document image data 1 for enabling determination of the device-independent color values (Lab values in the present example) corresponding to the CMYK values. In a case where the user does not assign such simulation profile, a predetermined default profile (e.g., Japan-Color 2001 Coated) may be assigned as the simulation profile 23. More precisely, as described in detail below, color transformation parameters that are corrected (edited) according to the corresponding PCS are used as the simulation profiles.

Also, an authorized user of the editing site 25 may create (generate/edit) a suitable PCS to be used for a color transformation process of the color transformation unit 16. The authorized user may upload the PCS in the profile DB 29 of the server site 30 corresponding to the shared DB and notify the content producers (users) of the content production site 21 of the PCS.

Figure 3:
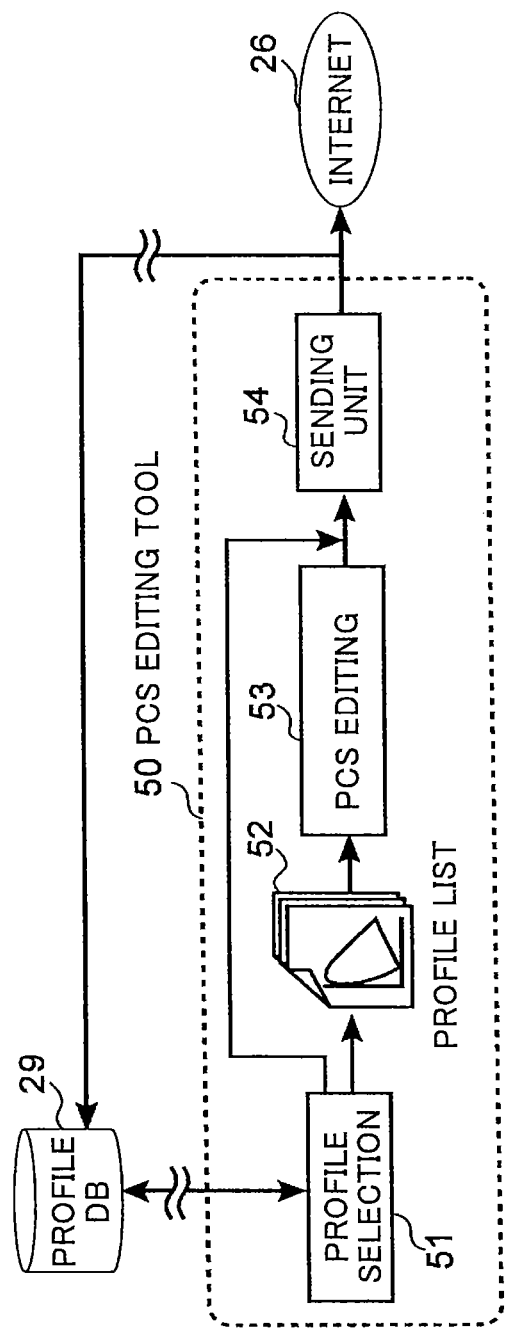
FIG. 3 is a block diagram showing a functional configuration and a process flow of a PCS editing tool of the color management system.

FIG. 3 is a block diagram showing a functional configuration and a process flow of a PCS editing tool 50. The PCS editing tool 50 shown in FIG. 3 is provided by an application server 27 of the server site 30 and is run on a PC 22 of the editing site 25 (see FIG. 2). The authorized user of the editing site may create (generate/edit) a PCS using the editing tool 50.

The PCS editing tool 50 includes a profile selection unit 51 that enables a user to select plural profiles of output devices to be used as output targets from the profiles that are registered in the profile DB 29 and creates a profile list 25 containing the selected profiles that is input to a PCS editing unit 53. It is noted that in selecting the profiles of output devices, the profile selection unit 51 assumes that a different output device exits for each paper profile. That is, when an output condition of a given image output device changes depending on the paper or color material (ink, toner) used, the given image output device is regarded as plural different output devices with different profiles corresponding the different output conditions. Also, it is noted that when the profile selection unit 51 selects a given profile of an output device, this means that the profile selection unit 51 is selecting the corresponding output device as well. Thus, the profile selection unit 51 also acts as an output device selection unit.

The PCS editing unit 53 obtains gamut information of the selected output devices included in the profile list 52 and automatically generates a PCS according to a predetermined PCS generation method corresponding to a PCS generation strategy selected by the user or a default PCS generation strategy. The user may also edit the automatically generated PCS using the PCS editing unit 53. The PCS created (generated/edited) in this manner is registered in the profile DB 29 and identification information of the PCS is sent to the content producers (users) of the content production site 21 via a sending unit 54.

It is noted that the profile selection unit 51 may also select a preregistered PCS instead of selecting plural profiles of output devices. In this case, the profile list generation process and the PCS editing process may be omitted and identification information of the selected preregistered PCS may be sent to the content producers (users) of the content production site 21 via the sending unit 54 (the PCS is already registered in the profile DB 29).

Figure 4:
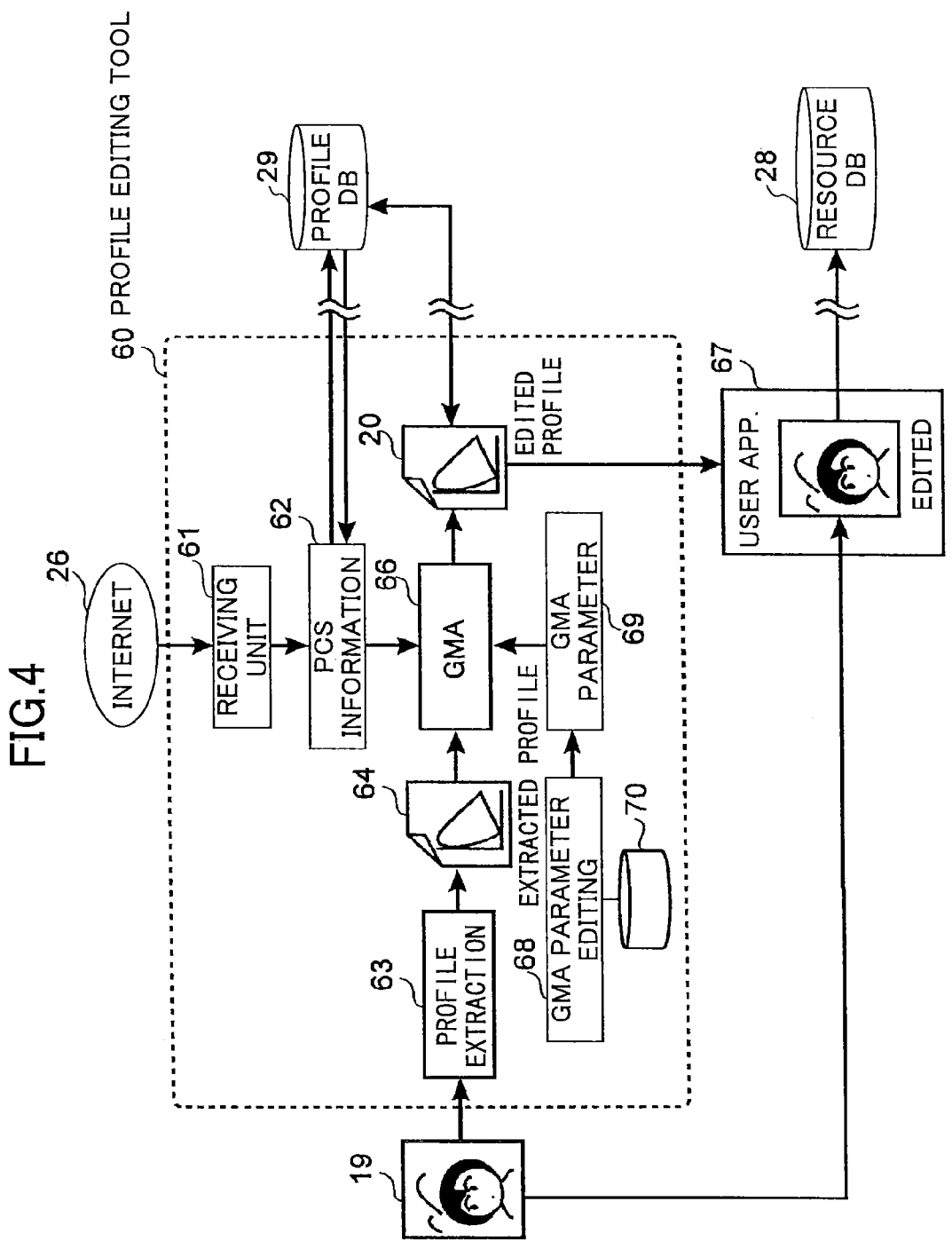
FIG. 4 is a block diagram showing a functional configuration and a process flow of a profile editing tool of the color management system.

FIG. 4 is a block diagram showing a functional configuration and a process flow of a profile editing tool 60. The profile editing tool 60 shown in FIG. 4 is provided by the application server 27 of the server site 30 and is run on the PC 18 of the content production site 21.

A receiving unit 61 of the profile editing tool 60 receives the PCS identification information sent from the editing site 25 via the sending unit 54. Based on the PCS identification information, a PCS obtaining unit 62 obtains PCS information (i.e., the PCS itself) from the profile DB 29. In this way, the PCS identified by the received PCS identification information may be designated as the default PCS at the profile editing tool 60. However, it is noted that the user may use a file browser (not shown) to search and select a given PCS registered in the profile DB 29 as the PCS to be used.

A user at the content production site 21 may use a profile extraction unit 63 to extract a profile of an editing object. In the present example, an RGB profile 64 is extracted from the RGB image data 19. However, in a case where a profile is not assigned to the RGB image data 19, a sRGB profile based on sRGB characteristics may be used as the default profile. As is described in detail below, the user may also use a file browser (not shown) to search and select a given profile registered in the profile DB 29 as the profile associated with the editing object.

The user may use a GMA parameter editing unit 68 to edit a gamut mapping algorithm for confining the gamut of the RGB image data 19 within the range of the designated PCS (the details of the GMA editing is described below). The resulting GMA parameters 69 corresponding to gamut mapping control parameters obtained from the GMA editing process are passed over to a GMA unit 66. The GMA parameter editing unit 68 may also store edited GMA parameters in a GMA parameter DB 70, or reuse the GMA parameters stored in the GMA parameter DB 70, for example.

The GMA unit 66 uses the GMA parameters 69 to transform the RGB profile 64 corresponding to the editing profile into an RGB profile 20 having Lab values within the range of the designated PCS. The RGB profile 20 has a gamut that is adjusted to be within the range of the designated PCS and has color transformation parameters for RGB→PCS transformation and PCS→RGB transformation that are adjusted according to the adjusted gamut. That is, the GMA unit 66 adjusts (edits) color transformation parameters to confine the gamut of the RGB image data within the range of the designated PCS based on the GMA parameters 69 corresponding to GMA editing results of the GMA parameter editing unit 68.

The user of the content production site 21 may set up the adjusted (edited) RGB profile 20 in a user application 67 to perform image editing. Then, the user may upload the edited RGB image data 19 in association with the RGB profile 20 in the resource DB 28 of the server site 30.

The above descriptions relate to adjustment (editing) of an RGB profile at the content production site 21.

It is noted that similar adjustment (editing) processes based on the designated PCS may be performed on a CMYK profile at the editing site 25 using the profile editing tool 60. That is, a user of the editing site 25 may run the profile editing tool 60 provided by the application server 27 on the PC 22, download a designated PCS from the profile DB 29, and download the CMYK profile 23 corresponding to the editing profile from the profile DB 29. Then, the user may perform adjustments on the CMYK profile 23 to confine its gamut to be within the range of the designated PCS and assign the adjusted (edited) CMYK profile to the CMYK image data 24. It is noted that the profile assigning process may be automatically implemented in a case where a document editing tool (not shown) provided by the application server 27 is used.

As can be appreciated from the above, a user may use the PCS editing tool 50 to select a given number of output devices from plural output devices that are available for selection, obtain gamut information of the profiles of the selected output devices, generate a PCS according to a predetermined PCS generation method based on the obtained gamut information, and edit the shape of the PCS as is necessary or desired. The PCS created in this manner may be designated at the profile editing tool 60. The user may use the profile editing tool 60 to adjust color transformation parameters of the RGB profile and CMYK profile so that their gamuts are confined within the range of the designated PCS, and store the adjusted RGB and CMYK profiles in association with the RGB image data and CMYK image data of the document image data 1, respectively. In this way, the color transformation unit 16 of FIG. 2 may perform color transformation processes using a PCS that is created based on the gamuts of the plural output devices selected by the user.

In the following, the PCS editing tool 50 and the profile editing tool 60 are described in further detail in association with their user interface screens.

Figure 5:
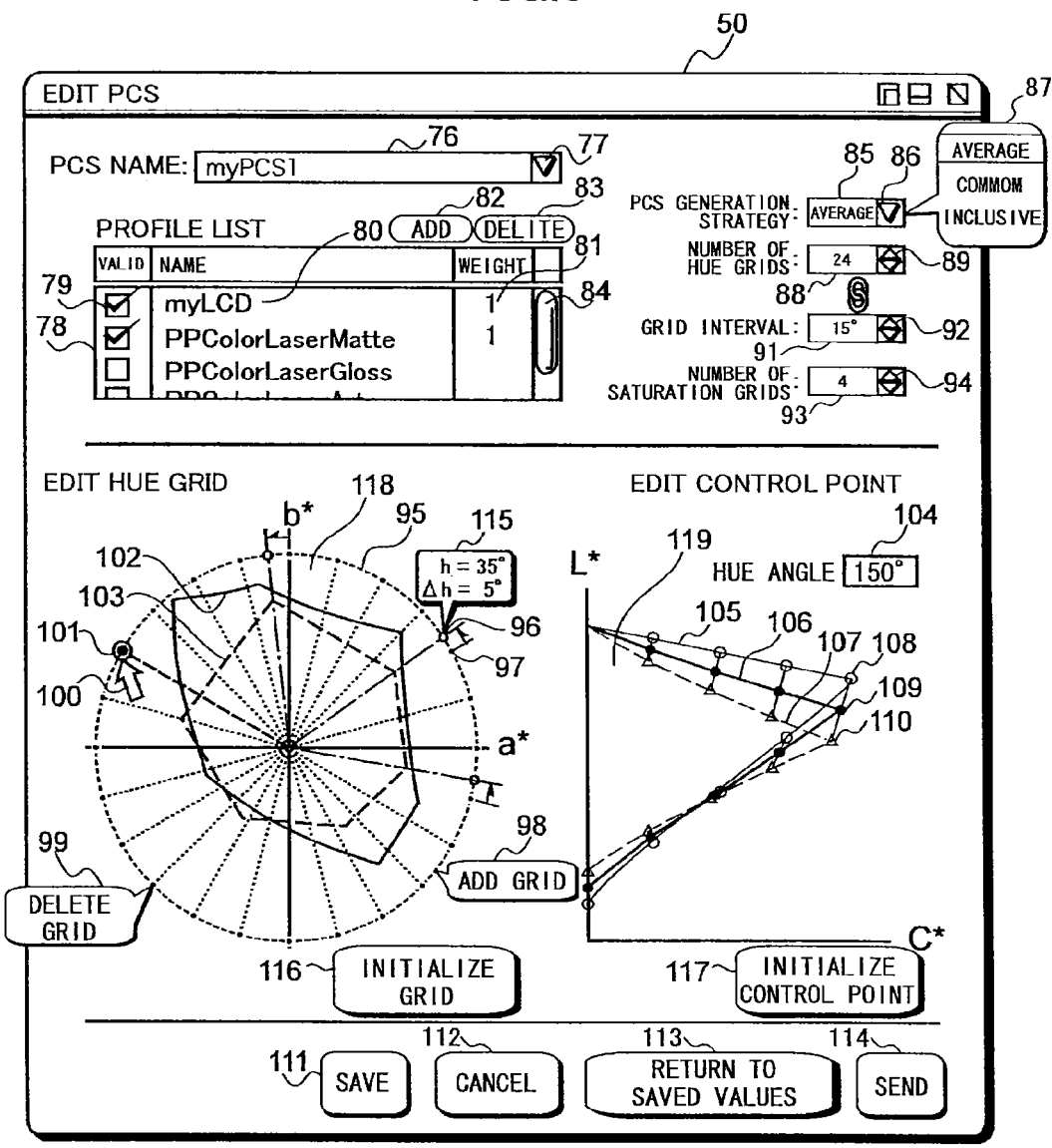
FIG. 5 is a diagram showing an exemplary user interface screen of the PCS editing tool.

FIG. 5 is a diagram showing an exemplary user interface screen of the PCS editing tool 50. First, the user inputs a name of the PCS that is to be created in a PCS name indicating portion 76 of the user interface screen of the PCS editing tool 50. It is noted that when a name is not yet input, "No Name" may be indicated at the PCS name indicating portion 76 as the default input.

As is described above with reference to FIG. 3, the user may use the profile selection unit 51 to select a PCS that is already registered in the profile DB 29 and send the identification information of the selected PCS to the users of the content production site 21. In this case, the user may press a select button 77 of the user interface screen to activate a file browser (not shown), select a PCS preregistered in the profile DB 29 using the file browser, and designate the name of the selected PCS in the PCS name indicating portion 76. That is, in the present example, the function of the profile selection unit 51 for selecting a preregistered PCS may be realized using a file browser. However, this is merely one illustrative example. After designating the PCS name in the PCS name indicating portion 76, the user may press a send button 114 at the bottom right side of the user interface screen to send the identification information of the designated PCS to the content production site 21.

In the case where a new PCS is to be created based on the gamuts of plural output devices, the user selects the profiles of the output devices (each paper profile being regarded as one output device). The user interface screen of FIG. 5 includes a profile list indicating portion 78, an add button 82, and a delete button 83 in connection with the profile selection process.

Each of the entries indicated at the profile list indicating portion 78 includes a checkbox 79, a profile name 80, and a weight coefficient 81. The checkbox 79 is a switch for designating the validity or invalidity of the corresponding entry. It is noted that only the entries having checkmarks in their checkboxes 79 become valid entries to be referenced in the subsequent editing operations. The entries without the checkmarks are invalid entries that are merely displayed at the profile list indicating portion 78 and are irrelevant to the subsequent editing operations. That is, of the profiles included in the profile list indicated at the profile list indicating portion 78, only the profiles having checkmarks in their corresponding checkboxes 79 are valid. These valid profiles correspond to the profiles selected by the profile selection unit 51 of FIG. 3 that are included in the profile list 52 of FIG. 3. Also, it is noted that an integer value that is greater than or equal to 0 may be designated as the weight coefficient 81. The weight coefficient 81 is used in a weighted average calculation process, which is described below.

In an initial state, the profile list indicating portion 78 is blank. The user may press the add button 82 to activate the file browser (not shown), select a profile of an output device stored in the profile DB 29 using the file browser, and add the selected profile as an entry in the profile list. To delete an existing entry, the user may selectively highlight the profile name of the profile entry to be deleted and press the delete button 83.

It is noted that in the above example, the function of the profile selection unit 51 for selecting the profiles of output devices that are to be referenced in generating/editing a PCS may be realized by the profile list indicating portion 78, the checkboxes 79, the add button 82, the delete button 83, and the file browser that is activated when the add button 82 is pressed. However, this is merely one illustrative example.

In FIG. 5, of the profiles indicated in the profile list indicating portion 78, the checkboxes 79 of the entries of two profiles with the names "myLCD" and "PPColorLaser-Matte" have checkmarks, indicating that these two profiles have been selected for use in the PCS generation/editing processes. It is noted that in the following descriptions, the gamut of the profile "myLCD" is referred to as "first gamut," and the gamut of the profile "PPColorLaserMatte" is referred to as "second gamut."

Although the gamuts of two output devices are used for the PCS generation/editing in the following descriptions, the gamuts of three or more output devices may be used as well. Also, in the following descriptions, it is assumed that the first gamut corresponds to a gamut of an RGB monitor and the second gamut corresponds to a gamut of a CMYK printer to illustrate an exemplary case where different gamuts are used. However, any given combination of output device profiles may be selected.

Referring back to FIG. 5, the user interface includes a PCS generation strategy indicating portion 85 that indicates a PCS generation strategy that is selected by the user from plural PCS generation strategy options 87 that may be displayed in response to the user pressing a select button 86. The PCS generation strategy represents the name of a predetermined PCS generation method that is used to automatically generate a PCS based on the gamuts of plural output devices. In the present example, three predetermined PCS generation methods referred to as "Average," "Common," and "Inclusive" are provided as PCS generation strategy options 87 from which the user may select a desired PCS generation strategy. It is noted that "Average" is set up as the default PCS generation strategy in this example.

A hue grid number indicating portion 88 indicates the number of hue grids that is selected by the user from plural options (not shown) that may be displayed in response to the user pressing a select button 89. In the present example, the options for the number of hue grids include the values 12, 18, 24, and 36, and the value 24 is set up as the default value.

A grid interval indicating portion 91 indicates the hue grid interval that is selected by the user from plural options (not shown) that may be displayed in response to the user pressing a select button 92. In the present example, the hue grid interval options include 30°, 20°, 15°, and 10°, and 15° is set up as the default value. It is noted that the number of hue grids and the grid interval are interlocked so that when one of the above values is changed, the other value is automatically adjusted to a corresponding value.

A saturation grid number indicating portion 93 indicates the number of saturation grids that is selected by the user from plural options (not shown) that may be displayed in response to the user pressing a select button 94. In the present example, the options for the number of saturation grids include the values 3, 4, 5, and 6, and the value 4 is set up as the default value.

It is noted that the number of hue grids and the number of saturation grids respectively indicated in the number of hue grids indicating portion 88 and the number of saturation grids indicating portion 93 are used as initial values for displaying the corresponding grids on the user interface of the PCS editing tool 50 in connection with editing the hue grids.

A PCS corresponding to a partial region of the Lab color space is automatically generated according to the predetermined PCS generation method corresponding to the PCS generation strategy designated in the PCS generation strategy indicating portion 85 based on the gamuts of the profiles of the output devices designated as valid in the profile list displayed at the profile list indicating portion 78. The user may change (edit) the shape of the automatically generated PCS. It is noted that the functions for automatically generating the PCS and editing the shape of the automatically generated PCS may be realized by the PCS editing unit 53 of FIG. 3.

In the following, the automatic generation of the PCS according to the designated PCS generation strategy and the editing of the generated PCS are described in connection with the user interface screen of the PCS editing tool 50.

At the lower left portion of the user interface screen of the PCS editing tool 50 shown in FIG. 5, projections of a first gamut 102 and a second gamut 103 on the a-b plane 118 of the Lab color space are shown. Also, control points 97 are positioned along the hue direction on a ring 95 surrounding the first gamut 102 and the second gamut 103. The control points 97 are arranged in accordance with the values designated in the number of hue grids indicating portion 88 or the grid interval indicating portion 91. The control points 97 represented by black dots on the ring 95 may be moved along the ring 95 by a mouse pointer and the corresponding degree (angle) of movement may be indicated at an indicator 115. Also, by right-clicking a mouse at a point on the ring 95 other than the control points 97, an add indicator 98 may be displayed and a control point 97 may be added at this point. It is noted that the add operation may be cancelled by moving the mouse cursor away from the add indicator 98. On the other hand, by right-clicking the mouse at one of the control points 97 on the ring 95, a delete indicator 99 may be displayed, and the corresponding control point 97 may be deleted. The delete operation may be cancelled by moving the mouse cursor away from the delete indicator 99.

By pressing an initialize button 116, edit operations performed on the grids on the ring 95 may be cancelled and the grid display may be restored to the initial grid display designated by the number of hue grids indicating portion 88 or the grid interval indicating portion 91.

Also, an editing hue indicating marker 101 represented by a double circle at a point on the ring 95 indicates the hue represented by a C-L cross plane 119 of the Lab color space at the lower right portion of the user interface screen of FIG. 5. The C-L cross plane 119 includes a hue angle indicating portion 104 that indicates a corresponding hue angle according to the position of the editing hue indicating marker 101. Further, the C-L cross plane 119 represents a cross plane of the first gamut 105 and a cross plane of the second gamut 107 at the corresponding hue angle indicated at the hue angle indicating portion 104.

Also, saturation reference control points are arranged at corresponding positions on the gamut boundary. That is, a maximum saturation point 108 of the first gamut and a maximum saturation point 110 of the second gamut are used as references, their corresponding saturation values are divided by the number designated at the saturation grid number indicating portion 93, and the reference control points of are arranged at the division points along the boundaries of the cross plane of first gamut 105 and the cross plane of the second gamut 107. In the C-L cross plane 119 shown in FIG. 5, the control points on the gamut boundary of the cross plane of the first gamut 105 are represented by circle marks (○), and the control points on the gamut boundary of the cross plane of the second gamut 107 are represented by triangle marks (Δ).

In the case where "Average" is designated as the PCS generation strategy at the PCS generation strategy indicating portion 85, control points represented by black circle marks (●) in FIG. 5 that define a PCS cross plane 106 at the corresponding hue are displayed. The control point (●) of the PCS cross plane 106 corresponds to the weighted center (i.e., weighted average) of corresponding control points of the first gamut and the second gamut that are set up as initial values. That is, in the case where "Average" is designated as the PCS generation strategy, the control points that define the boundary of the PCS that is automatically generated based on the first and second gamuts are determined by obtaining the "weighted averages" of corresponding control points of the first gamut and the second gamut. The control points obtained in this manner are indicated on the boundary of the generated PCS at the corresponding hue.

It is noted that the weight coefficient 81 designated in the profile list indicating portion 78 is used in calculating the weighted average. Before calculating the weighted average, the values of the weight coefficients 81 of the valid entries of the profile list are normalized so that their sum is equal to 1.

The control point (●) of the PCS cross plane 106 may be moved using a mouse. Also, as in the case of editing the hue grids, the control point may be added/deleted by right-clicking the mouse at a point along the PCS cross plane 106. In this way, the shape of the PCS generated based on the weighted average of the first gamut and the second gamut may be edited. Further, by pressing a reset button 117, the control points may be restored to their initial values (i.e., weighted centers of corresponding control points ○ and Δ).

Figure 6:
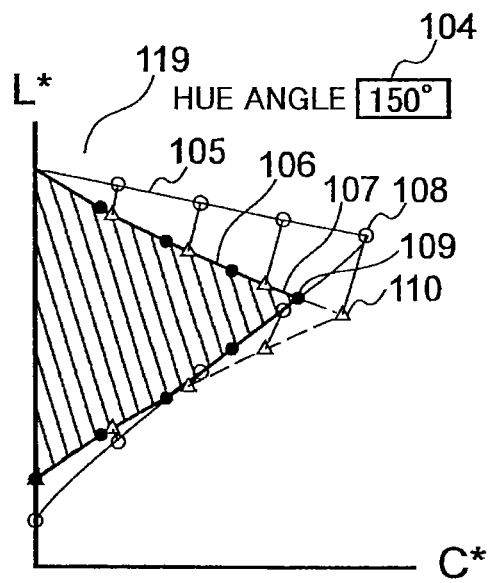
FIG. 6 is a diagram showing an exemplary C-L cross plane that may be displayed at the user interface screen of FIG. 5 when "Common" is selected as the PCS generation strategy.

FIG. 6 shows an example of the C-L cross plane 119 when "Common" is selected from the options 87 as the PCS generation strategy. The cross plane 106 of the PCS that is automatically generated according to the designated PCS generation strategy in this case defines a common portion between the cross plane of first gamut 105 and the cross plane of second gamut 107 at the corresponding hue. Also, the control points (●) are arranged along a saturation boundary that is determined by dividing the saturation at the maximum saturation point 109 of the PCS cross plane 106 by the number designated in the saturation grid number indicating portion 93. That is, the common portion between the first gamut and the second gamut is generated as the PCS. The shape of the PCS generated in this manner may be edited in a manner similar to the above case of editing the PCS generated according to the "Average" PCS generation strategy.

Figure 7:
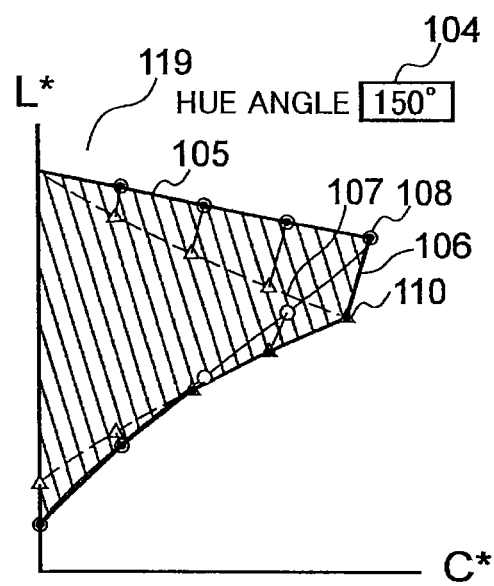
FIG. 7 is a diagram showing an exemplary C-L cross plane that may be displayed at the user interface screen of FIG. 5 when "Inclusive" is selected as the PCS generation strategy.

FIG. 7 shows an example of the C-L cross plane 119 when "Inclusive" is selected from the options 87 as the PCS generation strategy. The cross plane 106 of the PCS that is automatically generated according to the designated PCS generation strategy in this case defines a smallest polygon that includes the control points (○) of the cross plane of the first gamut 105 and the control points (Δ) of the cross plane of the second gamut 107 at the corresponding hue and is convex in the C* direction (i.e., C* does not have a minimum value when the boundary of the PCS cross plane 106 is regarded as a function of L*). In this case, the control points of the gamut cross plane corresponding to the vertices of the boundary of the PCS cross plane 106 become the control points of the PCS cross plane 106. That is, the smallest gamut including the first gamut and the second gamut is generated as the PCS. It is noted that the shape of the PCS generated in this manner may also be edited in a manner similar to that described above.

Referring back to FIG. 5, the bottom portion of the user interface screen of the PCS editing tool 50 includes a save button 111 for saving the PCS editing results, a cancel button 112 for cancelling the PCS editing results, a restore button 113 for restoring the values to the most recently saved editing results, and a send button 114. When the send button 114 is pressed, the editing results are saved and the edited PCS is uploaded in the profile DB 29 of the server site 30. Also, identification information of the edited PCS is sent to registered users.

Figure 8:
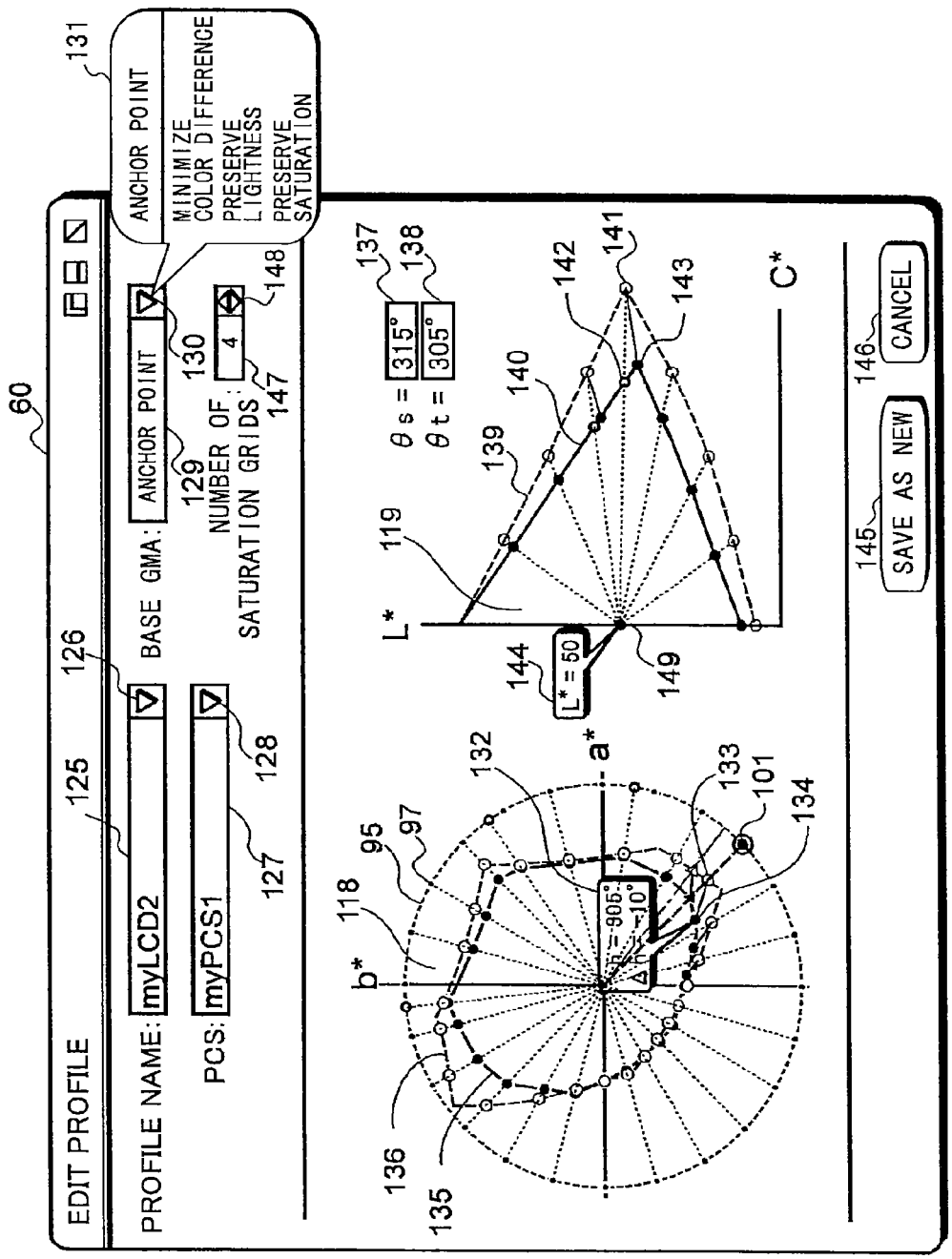
FIG. 8 is a diagram showing an exemplary user interface screen of the profile editing tool.

FIG. 8 shows an exemplary user interface screen of the profile editing tool 60. The user interface screen of the profile editing tool 60 includes a profile name indicating portion 125 that indicates the name of the profile to be edited (editing profile). It is noted that the profile 64 extracted by the profile extraction unit 63 shown in FIG. 4 or a profile registered in the profile DB 29 may be selected as the editing profile. The editing profile may be selected using a file browser (not shown) that may be activated by pressing a select button 126.

A PCS name indicating portion 127 indicates the name of the designated PCS. It is noted that the name of the PCS that is downloaded from the profile DB 29 by the PCS obtaining unit 62 based on the PCS identification information received by the receiving unit 61 of FIG. 4 is indicated in the PCS name indicating portion 127 as the default value. To change the designated PCS, a file browser (not shown) that may be activated by pressing a select button 128 may be used to select a desired PCS from the PCSs registered in the profile DB 29. In this case, the file browser is used to realize the function of the PCS obtaining unit 62 for obtaining the designated PCS.

A GMA indicating portion 129 indicates the name of the GMA that is selected from GMA options 131 that may be displayed upon pressing a select button 130. It is noted that "Anchor Point" is set up as the default value at the GMA indicating portion 129.

The a-b plane 118 displayed at the user interface screen of FIG. 8 shows the gamut boundary of an input profile corresponding to the editing profile (input profile gamut boundary 136), the boundary of the designated PCS (PCS boundary 135), and the grids that have been edited by the PCS editing tool 50. The points of intersection between the input profile gamut boundary 136 represented by a broken line and the grids correspond to input control points that are represented by circle marks (○). Points on the PCS boundary 135 corresponding to the input control points (○) are represented by black circle marks (●) as output control points. Hue correction may be performed by adjusting the output control points. For example, although the initial position of a corresponding output control point of a given input control point 133 is at the same hue as the input control point 133 (represented by a black triangle mark ▲ in FIG. 8), the initial output control point may be dragged using a mouse to the position of output control point 134. In this case, the input control point 133 at a hue angle of 315° corresponds to the output control point 134 on the PCS boundary 135 at a hue angle of 305°. It is noted that while the corresponding output control point is being dragged, an indicator 132 that indicates information on the corrected hue angle may be displayed. Also, a line connecting the corrected output control point 134 to the corresponding input control point 133 may be displayed.

The C-L cross plane 119 displayed on the user interface screen of FIG. 8 shows a gamut cross plane 139 of the input profile at the hue designated by the editing hue indicating marker 101, and a PCS cross plane 140 at the output control point 134 corresponding to the input control point 133 at the designated hue. Further, a hue angle indicating portion 137 indicates the hue angle of the input profile gamut cross plane 139, and a hue angle indicating portion 138 indicates the hue angle of the PCS cross plane 140.

The initial positions of input control points (○) arranged at the boundary of the input profile gamut cross plane 139 are determined by dividing the saturation at a vertex 141 of the gamut cross plane 139 by the number of grids designated at a saturation grid number indicating portion 147. It is noted that the number of saturation grids may be changed by pressing a selection button 148 in a manner similar to the case of editing the PCS. The initial positions of corresponding output control points (●) arranged at the boundary of the PCS cross plane may vary depending on the GMA name designated at the GMA indicating portion 129.

In the case where "Anchor Point" is selected at the GMA indicating portion 129, the initial positions of the control points (●) correspond to the points of intersection between the boundary of the PCS cross plane 140 and lines connecting an anchor point 149 on the L*-axis to the input control points (○). The positions of the output control points (●) may be adjusted within the PCS cross plane 140 by moving the control point (●) using a mouse. In the example shown in FIG. 8, the initial position of the output control point 142 corresponding to the vertex 141 is moved to the position of output control point 143. It is noted that the position of the anchor point 149 may also be dragged and adjusted. While the anchor point 149 is being dragged, an indicator 144 may indicate the lightness at the corresponding position.

It is noted that other GMA names that are available for selection at the GMA indicating portion 129 in the present example include "Minimize Color Difference," "Preserve Lightness," and "Preserve Saturation." In the case where "Minimize Color Difference" is selected, the initial position of the output control point is set at a point on the PCS cross plane 140 that is closest to the corresponding input control point. In the case where "Preserve Lightness" is selected, the initial position of the output control point is set at a boundary point of the PCS cross plane 140 having the same lightness as the corresponding input control point (or a point on the L*-axis if no corresponding boundary point exists). In the case where "Preserve Saturation" is selected, the initial position of the output control point is set at a boundary point of the PCS cross plane 140 having the same saturation as the corresponding input control point and is closer to the corresponding input control point (or the output control point 143 if no corresponding boundary point exists).

It is noted that the GMA (gamut mapping algorithm) for confining the input profile gamut within the range of the designated PCS may be edited by adjusting the input control points and the output control points. For example, the input control points may each have directional vectors directed to their corresponding output control points defined. The directional vectors from the input control points to their corresponding output control points may be passed on to the GMA unit 66 from the GMA parameter editing unit 68 of FIG. 4 as GMA parameters 69 so that the input profile may be corrected at the GMA unit 66.

A hue correction amount of a given point P within the input profile gamut that is outside the PCS range may be determined through interpolation (e.g., linear interpolation) of the hue correction amounts of the input control points near the given point P. The correction amounts for lightness and saturation may be determined in a similar manner though linear interpolation.

Figure 9:
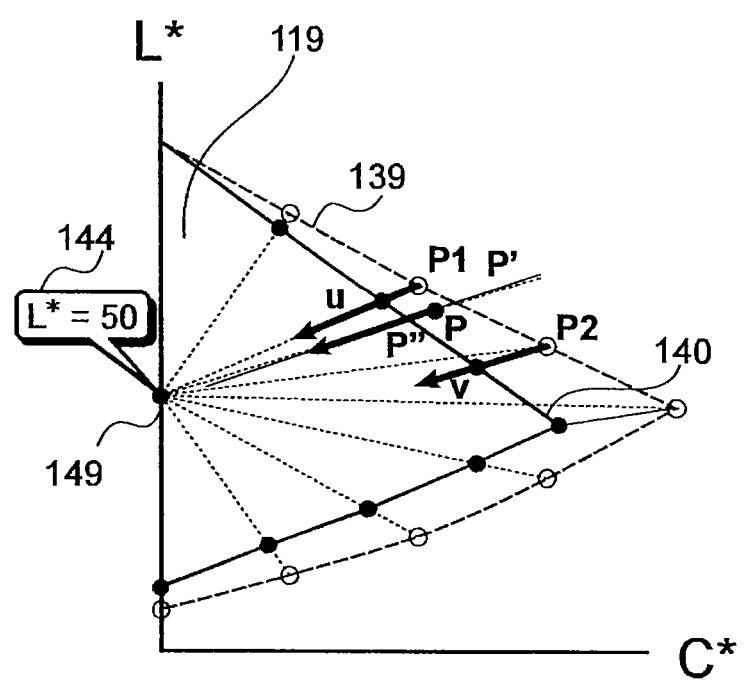
FIG. 9 is a diagram showing a gamut mapping method that is used when "Anchor Point" is selected as the GMA at the user interface screen of FIG. 8.

FIG. 9 shows an exemplary gamut mapping method for confining an input profile gamut within the range of the designated PCS when "Anchor Point" is selected at the GMA indicating portion 129. Assuming the C-L coordinates of control points between which point P is interposed are denoted as P1 and P2, the single direction vectors within the C-L plane representing their corresponding mapping directions are denoted as u and v, the point of intersection between line P1-P2 and a line connecting the anchor point 149 and point P is denoted as P', a parameter t that satisfies the formula P'=(1−t)P1+tP2 is used to obtain a mapping direction u' for mapping point P based on the formula u'=(1−t)u+tv, and a point of intersection P'" between the boundary of the PCS cross plane 140 and a line that passes through point P and extends in the mapping direction u' is determined to be the corresponding output point for point P. It is noted that application of the above example to cases where the other GMA options are selected are apparent so that their descriptions are omitted.

Once the gamut mapping method for compressing the gamut of an input profile to be within the range of the PCS is determined in the manner described above, a color transformation parameter for device color→PCS transformation, a color transformation parameter for PCS→device color transformation, and gamut information included in the input profile may be easily changed according to the designated PCS. It is noted that the corrected gamut information in this case corresponds to common portions of the gamut of the input profile and the designated PCS.

In the following, embodiments of a color management system according to the present invention that may encompass one or more aspects of the above embodiments are described.

<A> According to one embodiment, a color management system includes a color transformation unit that uses a profile connection space (PCS) to perform a color transformation process on input image data based on an input side color transformation parameter associated with the input image data for translating an input device-dependent color value that describes the input image data into a device-independent color value of the profile connection space and an output side color transformation parameter for matching the device-independent color value to an output device-dependent color value. The color management system further includes an output device selection unit that enables a user to select at least two output devices from plural output devices that are available for selection, and a profile connection space generation unit (e.g., PCS editing unit 53) that automatically generates the profile connection space according to a predetermined profile connection space generation method based on at least a first gamut and a second gamut of the output devices selected by the user.

According to an aspect of the present embodiment, by simply having a user select plural output devices as output targets, a suitable PCS may be set up based on the gamuts of the selected output devices. It is noted that the above color transformation unit may be embodied by the color transformation unit 16, for example. Also, the above output device selection unit and the profile connection space generation unit may be embodied by the profile selection unit 51 and the PCS editing unit 53 of the PCS editing tool 50, for example.

<B> According to a further embodiment, in the color management system <A> described above, the profile connection space that is automatically generated by the profile connection space generation unit is larger than a common portion of the first gamut and the second gamut of the output devices selected by the user.

According to an aspect of the above embodiment, even when the output devices selected by the user includes an output device with a small gamut, the range of the automatically generated PCS may be prevented from becoming excessively small. For example, in the case where "Average" or "Inclusive" is selected as the PCS generation strategy, the automatically generated PCS may be larger than the common portion of the gamuts of the selected output devices.

<C> According to a further embodiment, in the color management system <B> described above, a control point that defines a boundary of the profile connection space automatically generated by the profile connection space generation unit is obtained by calculating a weighted average of at least a first control point that defines a boundary of the first gamut and a second control point that defines a boundary of the second gamut.

It is noted that the above embodiment may correspond to a case where "Average" is selected as the PCS generation strategy, for example. According to an aspect of the present embodiment, priority may be given to the gamut of a certain output device of the selected output devices in generating the PCS.

<D> According to a further embodiment, in the color management system <C> described above, the profile connection space generation unit is configured to enable the user to edit a weight coefficient used for calculating the weighted average.

According to an aspect of the present embodiment, priority may be given to the gamut of a certain output device of the selected output devices in generating the PCS, and the user may be able to adjust the degree of priority. It is noted that the means for editing the weight coefficient may be included in the PCS editing tool 50, for example.

<E> According to a further embodiment, in the color management system <A>, <B>, <C>, or <D> described above, the profile connection space generation unit is configured to enable the user to change a shape of the profile connection space that is automatically generated.

According to an aspect of the above embodiment, the user may easily make slight adjustments to the shape of the PCS. It is noted that the means for changing the shape of the PCS may be included the PCS editing tool 50, for example.

<F> According to a further embodiment, the color management system <A>, <B>, <C>, <D>, or <E> described above includes a color transformation parameter correction unit that corrects the input side color transformation parameter associated with the input image data so that an input color space gamut of the input image data is confined within a range of the profile connection space.

According to an aspect of the above embodiment, the gamut of image data to be edited by members of a working group that are working in collaboration may be confined within the range of a common PCS that is commonly used. It is noted that the above color transformation parameter correction unit may be realized by the GMA unit 66 of the profile editing tool 60, for example.

<G> According to a further embodiment, the color management system <F> described above includes a gamut mapping edit unit that enables the user to edit a gamut mapping method for confining the input color space gamut of the input image data within the range of the profile connection space. The color transformation parameter correction unit corrects the input side color transformation parameter based on a control parameter of an edited gamut mapping method that is edited by the gamut mapping edit unit.

According to an aspect of the present embodiment, the method to be used to confine the gamut of image data to be edited by members of a working group that are working in collaboration within the range of the common PCS may be easily adjusted/optimized. It is noted that the above gamut mapping edit unit may be realized by the GMA parameter editing unit 68 of the profile editing unit 60, for example.

<H> According to another embodiment, a color management system includes a color transformation unit that uses a profile connection space to perform a color transformation process on input image data based on an input side color transformation parameter associated with the input image data for translating an input device-dependent color value that describes the input image data into a device-independent color value of the profile connection space and an output side color transformation parameter for matching the device-independent color value to an output device-dependent color value. The color management system also includes an output device selection unit that enables a user to select at least two output devices from plural output devices that are available for selection, a profile connection space generation unit that automatically generates the profile connection space according to a predetermined profile connection space generation method based on at least a first gamut and a second gamut of the output devices selected by the user, and a server that is connected to a network and is configured to store the output side color transformation parameter and the profile connection space. The output side color transformation parameter and the profile connection space stored at the server are shared by plural users via the network.

According to an aspect of the present embodiment, the PCS to be used in the color transformation process may not be limited to a predetermined PCS that is prepared beforehand. That is, each time a user selects the output devices to be used as output targets, the user may generate a suitable PCS according to the combination of the output devices selected, and the generated PCS may be easily shared via the network among the members of a working group that are working in collaboration. It is noted that the above color transformation unit may be realized by the color transformation unit 16, and the above output device selection unit and the profile connection space generation unit may be realized by the profile selection unit 51 and the PCS editing unit 53 of the PCS editing tool 50, for example.

<I> According to a further embodiment, the color management system <H> described above includes an application server that is connected to the network and is configured to provide the output device selection unit and the profile connection space generation unit to a user computer terminal that is connected to the network.

According to an aspect of the present embodiment, discrepancies in the versions of the PCS generation unit and resulting discrepancies in the PCS used by the members of the working group may be easily prevented.

<J> According to a further embodiment, the color management system <H> described above includes a color transformation parameter correction unit that corrects the input side color transformation parameter associated with the input image data so that an input color space gamut of the input image data is confined within a range of the profile connection space; and an application server that is connected to the network and is configured to provide the output device selection unit, the profile connection space generation unit, and the color transformation parameter correction unit to a user computer terminal that is connected to the network. The profile connection space generation unit includes a sending unit that sends a notification of the profile connection space to plural users; and the color transformation parameter correction unit sets up the profile connection space notified by the profile connection generation unit as a default profile connection space.

According to an aspect of the present embodiment, PCS setting operations by the members of the working group may be automated so that PCS setting errors may be prevented. Also, the gamut of image data to be edited by the members of the working group may be confined within the range of a common PCS that is commonly used by members of the working group. Further, discrepancies in the versions of the PCS generation unit and resulting discrepancies in the PCS used by the members of the working group may be easily prevented. It is noted that the above color transformation parameter correction unit may be realized by the GMA unit 66 of the profile editing tool 60, and the sending unit for sending the notification of the generated PCS to plural users may be realized by the sending unit 54 of the PCS editing tool 50, for example.

Further, the present invention is not limited to these embodiments, and numerous variations and modifications may be made without departing from the scope of the present invention. It is noted that the present invention includes various computer program applications that realize one or more features of the PCS editing tool 50 and the profile editing tool 60 described above.

The present application is based on and claims the benefit of the priority of Japanese Patent Application No. 2012-030416 filed on Feb. 15, 2012, with the Japanese Patent Office, the entire contents of which are hereby incorporated by reference.

What is claimed is:

1. A color management system comprising:
   circuitry configured to:
   enable a user to select at least two output devices from plural output devices that are available for selection;
   enable the user to select a profile connection space generation strategy from among a plurality of profile connection space generation strategies; and
   generate a profile connection space based on the selected profile connection space generation strategy and based on at least a first gamut and a second gamut of the at least two output devices selected by the user, the profile connection space corresponding to a common profile connection space for the at least two output devices, and the profile connection space being used to perform a color transformation process on input image data based on an input side color transformation parameter associated with the input image data for translating an input device-dependent color value, of an input device color space, that describes the input image data into a device-independent color value of the profile connection space, and an output side color transformation parameter for matching the device-independent color value to an output device-dependent color value of an output device color space,
   wherein a different output side color transformation parameter is used for matching the device-independent color value to the output device-dependent color value based on a type of paper used by one of the at least two output devices.

2. The color management system as claimed in claim 1, wherein
   the profile connection space is larger than a common portion of the first gamut and the second gamut of the at least two output devices selected by the user.

3. The color management system as claimed in claim 1, wherein
   a control point that defines a boundary of the profile connection space is obtained by calculating a weighted average of at least a first control point that defines a boundary of the first gamut and a second control point that defines a boundary of the second gamut.

4. The color management system as claimed in claim 3, wherein
   the circuitry is configured to enable the user to edit a weight coefficient used for calculating the weighted average.

5. The color management system as claimed in claim 1, wherein
   the circuitry is configured to enable the user to change a shape of the profile connection space.

6. The color management system as claimed in claim 1, wherein
   the circuitry is configured to correct the input side color transformation parameter associated with the input image data so that the input device color space corresponding to the input image data is confined within a range of the profile connection space.

7. The color management system as claimed in claim 6, wherein the circuitry is configured to
   enable the user to edit a gamut mapping method for confining the input device color space corresponding to the input image data within the range of the profile connection space, and
   correct the input side color transformation parameter based on a control parameter of the edited gamut mapping method.

8. The color management system as claimed in claim 1, wherein
   the profile connection space generation strategy includes one of an average strategy, a common strategy, and an inclusive strategy.

9. The color management system as claimed in claim 8, wherein the circuitry is configured to
   determine a common portion of the first gamut and the second gamut of the at least two output devices selected by the user, and
   generate the profile connection space according to the common strategy based on the determined common portion.

10. The color management system as claimed in claim 8, wherein the circuitry is configured to
    determine a weighted average of the first gamut and the second gamut of the at least two output devices selected by the user, and
    generate the profile connection space according to the average strategy based on the determined weighted average.

11. The color management system as claimed in claim 8, wherein the circuitry is configured to
    determine inclusive portions of the first gamut and the second gamut of the at least two output devices selected by the user, and
    generate the profile connection space according to the inclusive strategy based on the determined inclusive portions.

12. The color management system as claimed in claim 1, wherein
the circuitry is configured to enable the user to select a plurality of profiles corresponding to the at least two output devices, and
a checkbox indicates whether each of the selected plurality of profiles are valid or invalid.

13. The color management system as claimed in claim 1, further comprising a database that stores a plurality of different output side color transformation parameters, each of the plurality of different output side color transformation parameters corresponding to a different type of paper.

14. The color management system as claimed in claim 1, wherein the at least two output devices are distributed across different locations over a network.

15. The color management system as claimed in claim 1, wherein the circuitry is configured to enable the user to edit the profile connection space after the profile connection space is generated.

16. A color management system comprising:
circuitry configured to:
enable a user to select at least two output devices from plural output devices that are available for selection;
enable the user to select a profile connection space generation strategy from among a plurality of profile connection space generation strategies;
generate a profile connection space based on the selected profile connection space generation strategy and based on at least a first gamut and a second gamut of the at least two output devices selected by the user, the profile connection space corresponding to a common profile connection space for the at least two output devices, and the profile connection space being used to perform a color transformation process on input image data based on an input side color transformation parameter associated with the input image data for translating an input device-dependent color value, of an input device color space, that describes the input image data into a device-independent color value of the profile connection space, and an output side color transformation parameter for matching the device-independent color value to an output device-dependent color value of an output device color space; and
store the output side color transformation parameter and the profile connection space in a memory, wherein
the output side color transformation parameter and the profile connection space are shared by plural users via a network, and
a different output side color transformation parameter is used for matching the device-independent color value to the output device-dependent color value based on a type of paper used by one of the at least two output devices.

17. The color management system as claimed in claim 16, wherein
the circuitry is provided to a user computer terminal that is connected to the network.

18. The color management system as claimed in claim 16, wherein the circuitry is configured to
correct the input side color transformation parameter associated with the input image data so that the input device color space corresponding to the input image data is confined within a range of the profile connection space,
be provided to a user computer terminal that is connected to the network,
send a notification of the profile connection space to the plural users, and
set up the profile connection space as a default profile connection space.

19. A color management system comprising:
circuitry configured to:
enable a user to select at least two output devices from plural output devices that are available for selection;
enable the user to select a profile connection space generation strategy from among a plurality of profile connection space generation strategies; and
generate a profile connection space based on the selected profile connection space generation strategy and based on at least a first gamut and a second gamut of the at least two output devices selected by the user, the profile connection space being used to transform input image data from an input device color space to an output device color space, and the generated profile connection space corresponding to a common profile connection space for the at least two output devices.

* * * * *